(12) United States Patent
Hwang

(10) Patent No.: US 9,649,675 B2
(45) Date of Patent: May 16, 2017

(54) IN-SITU CAPPING WITH NO LOSS OF WATER DEPTH

(71) Applicant: Daekyoo Hwang, West Chester, PA (US)

(72) Inventor: Daekyoo Hwang, West Chester, PA (US)

( * ) Notice: Subject to any disclaimer, the term of this patent is extended or adjusted under 35 U.S.C. 154(b) by 5 days.

(21) Appl. No.: 14/589,722

(22) Filed: Jan. 5, 2015

(65) Prior Publication Data

US 2015/0117954 A1    Apr. 30, 2015

Related U.S. Application Data

(63) Continuation-in-part of application No. 13/294,989, filed on Nov. 11, 2011, now Pat. No. 8,926,221, (Continued)

(51) Int. Cl.
*B09C 1/00* (2006.01)
*B09C 1/08* (2006.01)
(Continued)

(52) U.S. Cl.
CPC ............. *B09C 1/00* (2013.01); *B09B 1/006* (2013.01); *B09C 1/02* (2013.01); *B09C 1/08* (2013.01);
(Continued)

(58) Field of Classification Search
CPC .. B09B 1/006; B09C 1/00; B09C 1/02; B09C 1/08; B09C 2101/00; E02B 3/126; E02B 3/023; E02F 5/28
See application file for complete search history.

(56) References Cited

U.S. PATENT DOCUMENTS 4,541,752 A * 9/1985 Phillips ................. B09B 1/00
                                                    405/129.85
4,749,479 A * 6/1988 Gray .................... B01D 24/26
                                                    210/170.08
(Continued)

OTHER PUBLICATIONS

Minnesota Pollution Control Agency, Proposed PLan for the Sediment Operable Unit St. Louis River/Interlake/Duluth Tar Superfund Site, Apr. 2004, All Pages.*

*Primary Examiner* — Benjamin Fiorello
(74) *Attorney, Agent, or Firm* — Ryder, Lu, Mazzeo & Konieczny LLC; Joseph M. Konieczr, Sr.; Gregory J. Gore

(57) ABSTRACT

A method of remediating contaminated sediment area. The sediment has an initial water depth and comprises water and fine-grained solids. The contaminated sediment is contained in place by installing over the contaminated sediment an in-situ cap having a total thickness TCP. The contaminated sediment, and optionally any uncontaminated subsurface, is then consolidated until the total settlement of the contaminated and uncontaminated sediment exceeds the thickness TCP of the in-situ cap. The sediment is consolidated by installing a vertical barrier along the perimeter of the contaminated sediment area, installing a plurality of horizontal line drains into the sediment, connecting the horizontal line drains to a vacuum source, installing an in-situ cap over the contaminated sediment area and over the upper edge of the vertical barrier, and applying vacuum pressure to the horizontal line drains to dewater and consolidate the sediment.

17 Claims, 10 Drawing Sheets

Related U.S. Application Data which is a continuation-in-part of application No. 12/368,054, filed on Feb. 9, 2009, now abandoned.

(51) Int. Cl.
  *B09C 1/02* (2006.01)
  *B09B 1/00* (2006.01)
  *E02F 5/28* (2006.01)
  *E02B 3/12* (2006.01)
  *E02B 3/02* (2006.01)

(52) U.S. Cl.
  CPC ............... *E02B 3/126* (2013.01); *E02F 5/28* (2013.01); *B09C 2101/00* (2013.01); *E02B 3/023* (2013.01)

(56) References Cited

U.S. PATENT DOCUMENTS

| | | | | |
|---|---|---|---|---|
| 4,752,402 A * | 6/1988 | Gray | ...................... | B01D 24/26 210/747.9 |
| 5,037,240 A * | 8/1991 | Sherman | .................... | B09C 1/00 405/128.15 |
| 5,080,528 A * | 1/1992 | Ressi di Cervio | ........ | E02B 3/16 405/129.7 |
| 5,150,988 A * | 9/1992 | Powell | ................ | B01F 3/04978 405/128.5 |
| 5,857,807 A * | 1/1999 | Longo, Sr. | ................ | B09B 1/00 166/369 |
| 5,885,026 A * | 3/1999 | Hwang | ..................... | B09B 1/00 210/901 |
| 5,885,203 A * | 3/1999 | Pelletier | ................. | B09C 1/005 210/170.07 |
| 6,119,375 A * | 9/2000 | Wilson, Sr. | ............... | B09B 1/00 37/195 |
| 6,283,676 B1 * | 9/2001 | Hater | ........................ | B09B 1/00 210/747.1 |
| 6,364,572 B1 * | 4/2002 | Hudgins | .................. | B09B 1/00 405/129.35 |
| 6,386,796 B1 * | 5/2002 | Hull | ......................... | B09C 1/00 405/128.1 |
| 7,454,847 B1 * | 11/2008 | Miller | ....................... | F26B 5/14 34/397 |
| 7,695,215 B2 * | 4/2010 | Buhr | ....................... | E02D 15/10 405/17 |
| 2006/0222463 A1 * | 10/2006 | Subbarayan | ............. | B09B 1/00 405/129.85 |
| 2010/0222481 A1 * | 9/2010 | Jersak | ...................... | B09C 1/08 524/413 |

* cited by examiner

FIG. 5.A
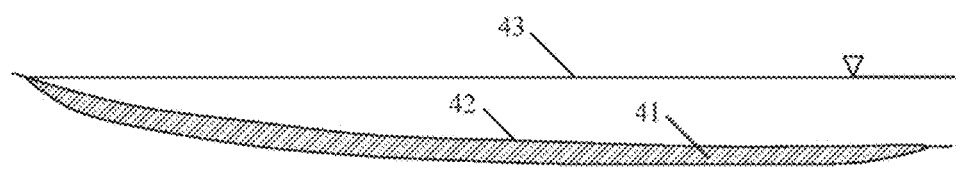
FIG. 5.B
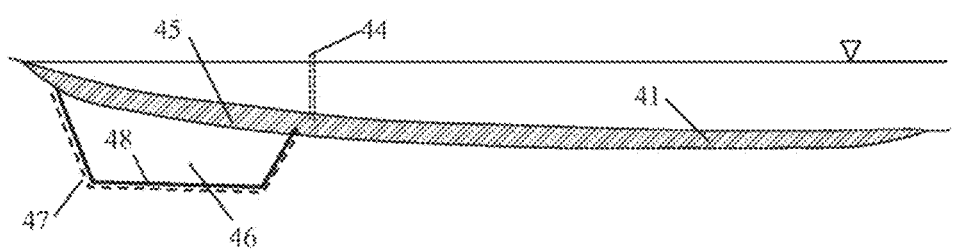
FIG. 5.C
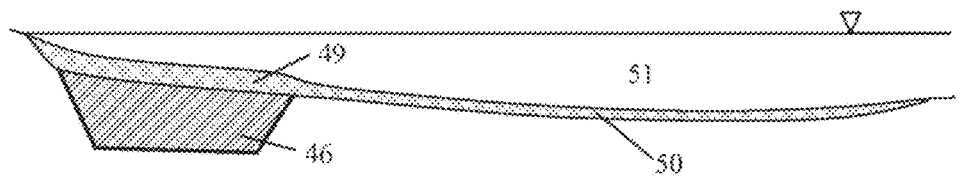

Geotextile
Geotextile

Geotextile
Reactive layer
Barrier layer

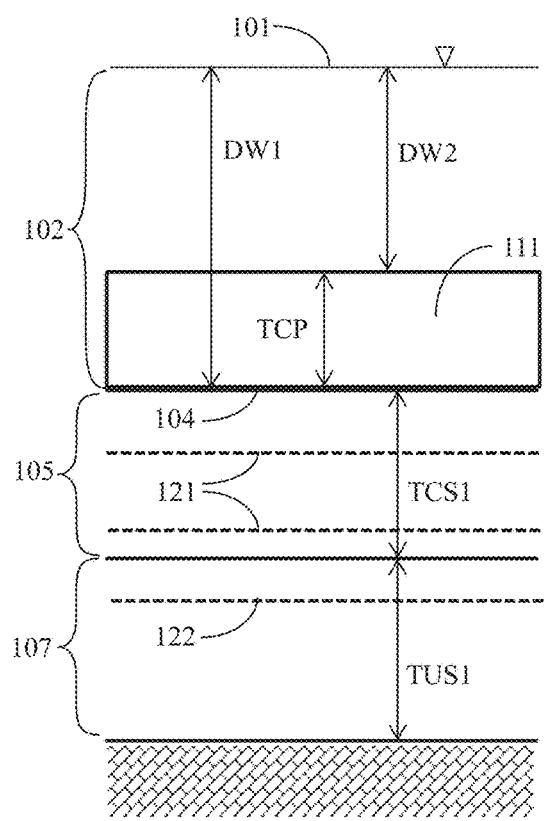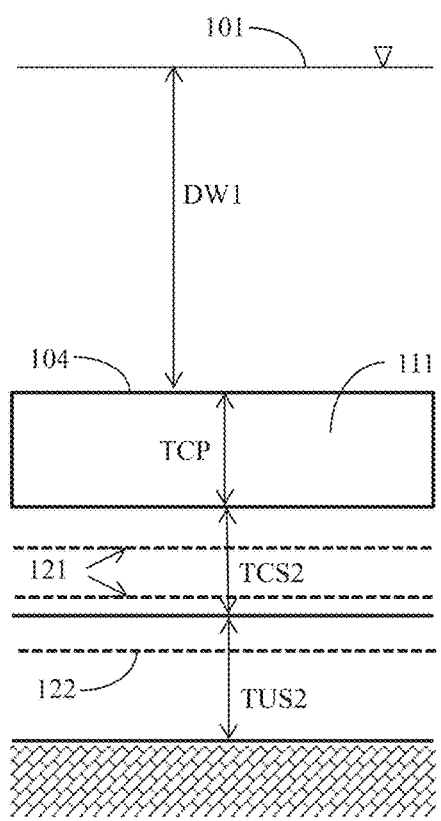

Fig. 11a
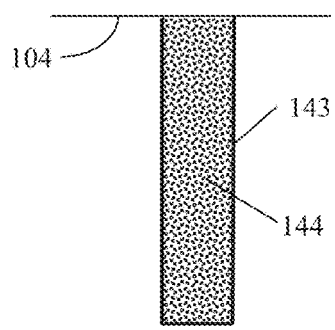
Plan view
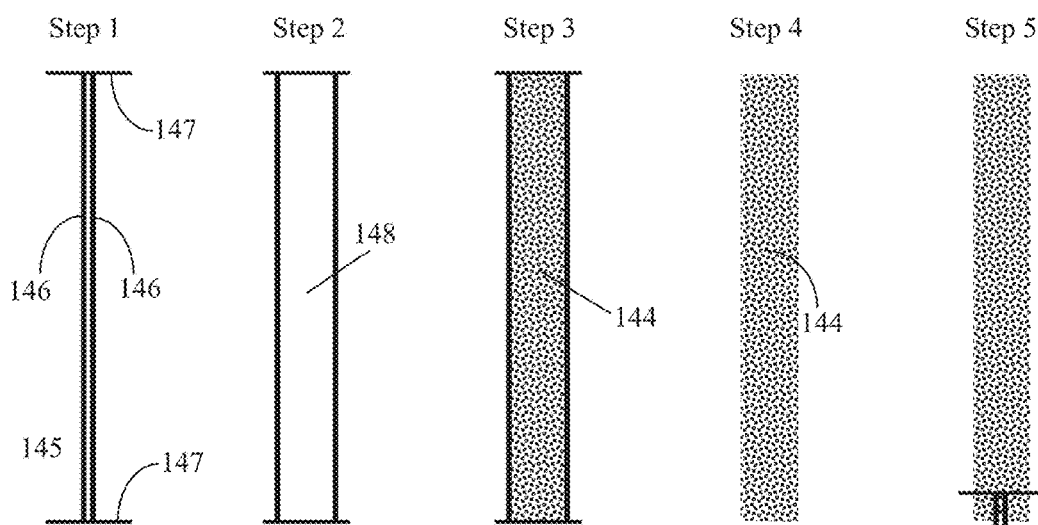
Fig. 11b
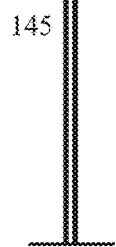

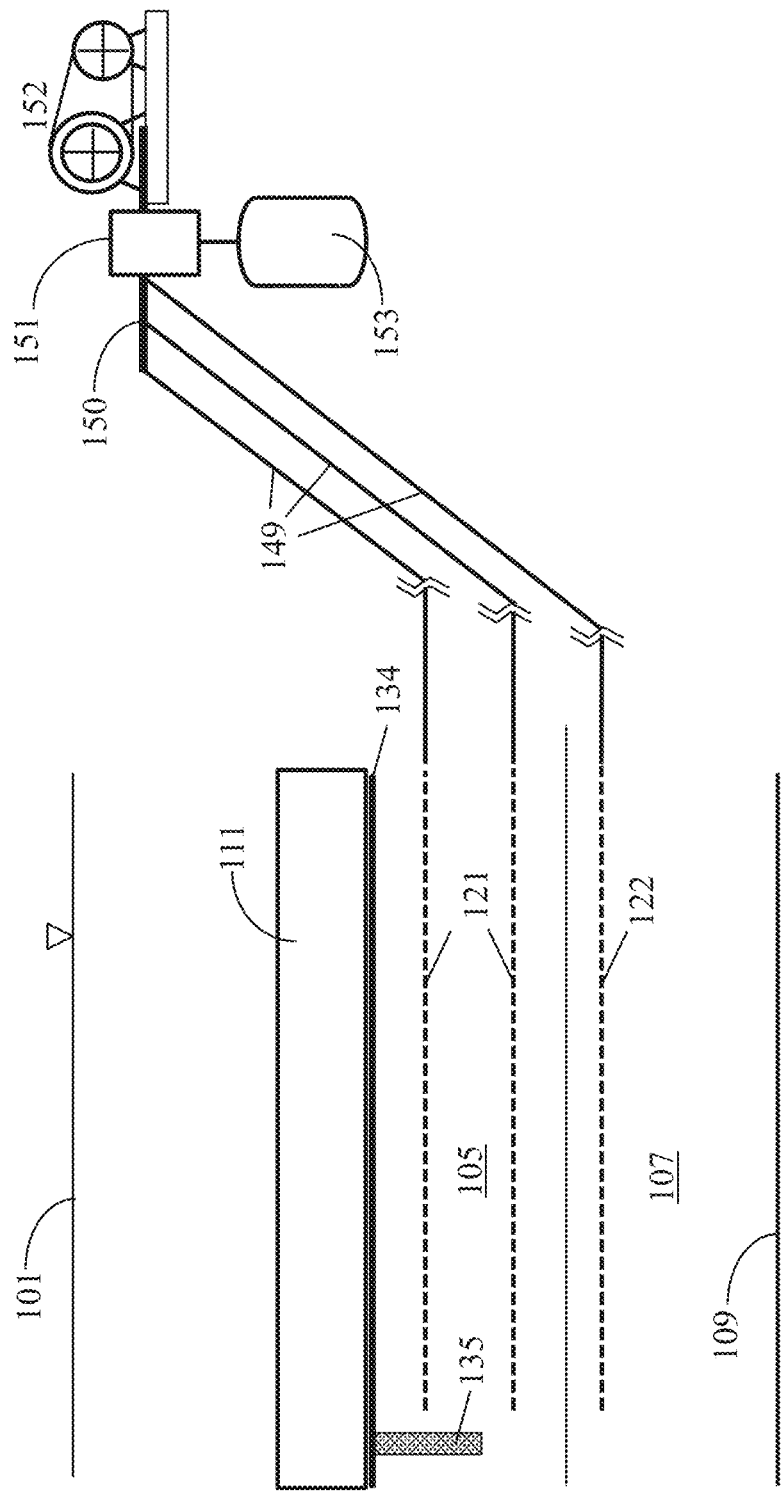

IN-SITU CAPPING WITH NO LOSS OF WATER DEPTH

CROSS REFERENCE TO RELATED APPLICATIONS

The present invention is a continuation-in-part application and claims priority to U.S. patent application Ser. No. 13/294,989 filed Nov. 11, 2011 entitled Concurrent Disposal And Consolidation Of Dredged Sediment Using Horizontal Drains And Vacuum Loading, which is a continuation-in-part application of and claims priority to U.S. patent application Ser. No. 12/368,054 filed Feb. 9, 2009 entitled Concurrent Disposal And Consolidation Of Dredged Sediment Using Horizontal Drains And Vacuum Loading, both of which are incorporated herein by reference.

FIELD OF INVENTION

This invention relates to methods of remediating and consolidating contaminated sediment by secure containment in a disposal facility, or in-situ with minimal or no loss of water depth.

BACKGROUND OF THE INVENTION

Past industrial activities have contaminated sediment in many streams, rivers, lakes, and harbors. The contaminated sediment requires remediation to mitigate its potential impact on ecological receptors, human health, or environmental media. An overview of sediment remediation options is provided below.

In-situ Capping—In-situ capping isolates contaminated sediment from the surrounding surface water body or ecological receptors by placing a protective cover over the contaminated sediment area.

In-situ Treatment—treatment refers to treatment of the contaminated sediment at its current location without removal. The treatment methods include biological, chemical, and physical processes.

Removal—Removal is a necessary step for other remediation methods such as ex-situ treatment, off-site disposal or on-site disposal. The most common removal method is dredging. Excavation is also used if the sediment is under a shallow water body that may be drained temporarily using a simple and economical surface water barrier.

Ex-situ Treatment—In this approach, contaminated sediment is removed from its current location and treated. Ex-situ treatment methods include bioremediation, chemical treatment, soil washing, solidification/stabilization and others.

Off-site Disposal—Even after ex-situ treatment, the quality of treated sediment may not fully meet all regulatory requirements. In this case, the treated sediment is taken to an off-site disposal facility (sanitary, industrial or hazardous waste landfill) for safe disposal.

On-site Disposal—Contaminated sediment may be removed and contained, with or without treatment, in an engineered disposal facility built at the project site solely for disposal of the target sediment. The disposal facility filled with sediment is closed as a landfill. Therefore, sediment dewatering is essential. Two common dewatering methods are mechanical dewatering and geotube dewatering.

In mechanical dewatering, dredged sediment is pumped to a mechanical dewatering unit (e.g., a centrifuge, a belt press, or a filter press), dewatered, and cake is placed in the disposal facility. Often, the cake requires solidification/stabilization as cake from mechanical dewatering cannot support earthwork equipment used for disposal work.

Geotube dewatering uses geotubes for dewatering. Geotubes are large filter bags made of geotextile. Dredged sediment is pumped into a geotube and water is allowed to drain, leaving solids in the geotube. After the geotube is filled with dredged sediment, the sediment is allowed to drain for some time. When the geotube collapses as water is drained, more dredged sediment is pumped into the geotube. After cycles of filling and draining, the geotube is filled with "drained" sediment. The drained sediment may be dewatered further, if desired, by evaporative drying for several weeks. The dewatered sediment may be taken off site for disposal. For on-site disposal, geotubes may be deployed within the disposal pond before they are filled.

Contained Aquatic Disposal—Contained aquatic disposal is underwater disposal and capping of dredged sediment in natural depressions, excavated pits or bermed areas at the bottom of water bodies. This method is often used for disposal of the sediment dredged from harbors and urban waterways where on-site disposal is not feasible due to limited land area. The disposal sites are selected from areas with a sufficient water depth (to avoid interruption of navigation) and low water energy (to avoid erosional loss of contained sediment).

Consolidation refers to a process of soft clayey soils subject to a load undergoing volume reduction and strength gain as a result of water being squeezed out of the loaded soil volume. As clayey soils do not allow water to flow out easily due to its very low hydraulic conductivity, drainage pathways are provided in the soil volume to accelerate consolidation. The most common way of providing drainage pathways is to insert wick drains vertically into the clay layer with a typical spacing of about 1.5 m. A wick drain is a long strip about 0.5 cm thick and 10 cm wide and consists of a plastic core wrapped with geotextile filter. Wick drains facilitate flow of water from soft clayey soils to the ground surface.

Accelerated consolidation with wick drains has been used for numerous construction projects on soft clayey soils. However, it has not been used often for dewatering of dredged sediment in environmental remediation due to the inherent limitations described below. As consolidation is a method of stabilizing a full layer of soft soil, it is applicable to dredged sediment only after the disposal operation is completed. However, consolidation dewatering after filling a disposal pond with dredged sediment is not practical for the reasons described below.

To illustrate the point, suppose that consolidation dewatering is attempted for disposal of dredged sediment. Dredged sediment typically contains less than 10% solids by weight as it is pumped as a slurry. After settling in the disposal pond, its typical solids content is around 35% by weight, equivalent to 17% solids and 83% water by volume. As this is too soft to place a final cover for closure, the dredged sediment requires dewatering, in this case by consolidation. The pond surface must be stabilized first by draining and natural drying to allow equipment access. This step takes a very long time. The subsequent steps of consolidation work include covering the surface with a geotextile, spreading 0.5 to 1.0 m of sand (top blanket drain) over the geotextile, installing vertical wick drains into the soft sediment with an installation rig working on the top blanket drain, and loading with thick surcharge fill. As this fill cannot be placed in one step on the very soft sediment, it must be placed in small lifts, allowing time for consolidation and strength gain before applying the next lift. Thus, this loading step also takes a long time. A large settlement, typically about 50% of the initial sediment thickness, occurs as a result of consolidation. The final step of pond closure would be surface grading and final cover installation. Surface grading requires the surcharge fill equivalent to the total consolidation settlement to remain in the pond.

The steps described highlight three major problems in consolidation dewatering for on-site disposal of dredged sediment. First, these steps take very long, particularly in stabilizing the surface for equipment access and in applying the surcharge load in several lifts. Second, the capacity of the disposal pond is wasted by the fill equivalent to about 50% of the pond capacity. Third, the above two reasons make consolidation dewatering costly and impractical. For these reasons, consolidation dewatering is not viable for disposal of dredged sediment in environmental remediation, unless technical improvements are made. The above-described problems can be overcome if the sediment in the disposal pond is consolidated while dredged sediment is being discharged into the pond. Thus, it would be desirable to devise a method of consolidation dewatering concurrent with discharge of the dredged sediment into the disposal pond.

In achieving the goal stated above, vacuum loading will play a key role. Vacuum has been often utilized as a means of loading for consolidation projects. In this method, the ground surface is covered with an impermeable membrane and vacuum is applied to the underside of the membrane. This creates an effect of atmospheric pressure working as a load. Although vacuum consolidation offers some advantages, it is often troublesome due to incomplete seals along the edge of the membrane and its cost is significant. A Dutch firm COFRA (see COFRA webpage) practices a vacuum loading method that does not require membrane sealing by connecting the top of vertical wick drains with sealed vacuum lines within the soft clay layer, which is almost impermeable. The present invention intends to extend vacuum consolidation application to horizontal drains using self-sealing properties of fluid earthen medium which is the target for consolidation.

The Corps of Engineers performed a research project evaluating ways of stabilizing dredge spoils from navigation dredging and demonstrated that vacuum underdrainage is an effective way of stabilizing dredge spoil (Hammer, 1981). In this method, a layer of bottom blanket drain is installed in the disposal facility, dredge spoil is discharged, and a vacuum is applied to the bottom blanket drain.

In-situ capping refers to the isolation of contaminated sediment from the water column above by covering or capping the contaminated sediment area with clean barrier materials. The primary functions of in-situ capping include: physical isolation of the contaminated sediment from the benthic environment; stabilization of contaminated sediment to prevent re-suspension and transport to other sites; and/or, reduction of the flux of dissolved contaminants from the contaminated sediment into the water column above (EPA, 2005).

To perform these primary functions, in-situ caps may be designed with various materials such as sand, gravel, or a mixture of earthen materials. For better performance and protection, in-situ caps are also designed with multi layer components. Materials used for multilayer caps include various earthen materials, geotextiles, low permeability liners, and reactive layers for treatment or adsorptive sequestration of contaminants. An armor rock layer often tops the in-situ cap to maintain the stability of the cap against turbulent flows, wave actions or ice jams.

In-situ capping of contaminated sediment s well known. Examples of in-situ capping in prior art are shown in FIGS. 6a, 6b and 6c. FIG. 6a shows a simple form of in-situ capping, wherein a sand cap (often a foot or thicker) is placed over the surface area of contaminated sediment. FIG. 6b shows another form of in-situ capping wherein a sand cap is placed over the surface area of contaminated sediment and the sand cap is protected by a layer (often a foot or thicker) of armor rock. In FIG. 6b, geotextile is used between sand cap and armor rock and between contaminated sediment and sand cap to prevent mixing of the two different materials. FIG. 6c shows an example of multilayer cap that includes a sand cap placed over the surface area of contaminated sediment, a layer of armor rock to protect the sand cap, a barrier layer (a low permeability liner) to minimize the upward flux of contaminated pore water from the sediment, and a reactive layer to treat or adsorb contaminants passing across the barrier.

A known problem with in-situ, submerged capping is loss of water depth. Installation of an in-situ cap always reduces the water depth. At many sites, in-situ capping is not allowed due to institutional restrictions prohibiting any loss of water depth. Examples of such institutional restrictions include no loss of channel flow capacity, no loss of flood storage capacity, no loss of navigation depth, no loss of preferred habitat, and no loss of wetlands.

In-situ capping in general cannot overcome these restrictions because a loss of water depth is inevitable when cap materials are placed over the existing sediment as shown in prior art FIGS. 7a and 7b. A section of a submersed, contaminated-sediment site is schematically illustrated in FIG. 7a. The site includes a body of water, such as a lake or river, having a top water surface 101, water column 102, and water depth DW1. The water body sits above or flows over a contaminated sediment layer 105 having a top surface 104, and an initial thickness TCS1. The contaminated sediment layer 105 overlies an uncontaminated sediment layer 107 having an initial thickness TUS1. The uncontaminated sediment layer overlies firm soil or a bedrock surface 109.

FIGS. 7a and 7b show the change in the water depth from DW1 to DW2 after installation of an in-situ cap 111 with its thickness TCP. The loss of water depth is generally equivalent to TCP. Due to the load of the in-situ cap 111, the contaminated sediment 105 and uncontaminated sediment 107 may be compressed and settle a little but as its magnitude is very small, it is not shown in FIG. 7b for clarity. As a result, prior art in-situ capping methods cannot be used at contamination sites that prohibit any loss of water depth. To avoid the costly alternative of dredging and off-site disposal of contaminated sediment, it would be desirable to provide a method of in-situ capping that does not cause a loss of water depth.

SUMMARY OF THE INVENTION(S)

A first embodiment of the invention provides a method of remediating a contamination site containing a total volume $V_T$ of contaminated sediment having more than 70% water by volume and less than 30% fine-grained solids by volume. In accordance with the method, a disposal pond is initially established near the contamination site. In one embodiment, the pond comprises a diked disposal pond with a capacity sufficient to contain the total post-consolidation volume of contaminated sediment and is at least 6 m deep.

A first volume portion $V_1$ of the contaminated sediment is dredged and discharged into the disposal pond as a slurry.

The first volume portion $V_1$ is allowed to separate into a lower, settled solids portion and upper liquid portion.

After slurry separation, a plurality of parallel, coplanar horizontal drains are installed in the tower solids portion intermediate the bottom of the pond and the top of the solids portion, to form a first level of horizontal drains within the first layer of solids. The drains are preferably wick drains or tube drains. The first level of drains is preferably installed about 1.2 to 1.5 m above the bottom of the pond.

After installation of the first level of drains, the process of discharging additional volume portions $V_n$ into the pond and installing a successive level of drains is repeated until the total volume $V_T$ of the contaminated sediment is removed from the contamination site. Each successive level of horizontal drains is installed within the tower solids portion intermediate the horizontal top of the solids portion and the level of horizontal drains below it. The drains are preferably installed when the thickness of the solids portion above the uppermost installed drain is at least 2 to 2.4 m. In a preferred embodiment, the drains are installed with lateral spacing between each drain of about 1.2 to 1.8 m, initial vertical spacing between each level of about 1.8 to 3.0 m, and at least 0.5 in below the top surface of the solids portion. The drains of each vertically adjacent level may be offset laterally from one another. The drains are initially installed at vertically spaced locations considering solid consolidation and compression such that the final vertical spacing between drain levels after solids portion consolidation is about 0.9 to 1.2 m.

As each level of drains is installed, vacuum pressure is applied to each of said horizontal drains to extract water from the solids portion until the total volume $V_T$ of contaminated sediment is consolidated in the pond. Preferably, vacuum pressure is sequentially applied to and maintained on each drain level before the next successive drain level is installed.

The method of remediation preferably includes the step of closing the pond by draining the upper liquid portion from the uppermost solids portion, drying the uppermost solids portion, grading the solids portion to allow rainwater drainage away from the pond, and installing a final cover over the pond. In a preferred embodiment, the contaminated sediment is over-consolidated by maintaining vacuum pressure on the drains for a few months after installation of the final cover.

In a preferred embodiment, disturbance of the solids portion during drain installation is minimized by suspending the drain installation equipment and drain supply on or above the liquid portion and plowing the drains into the settled sediment. In one embodiment, the drains are installed using a barge that floats on and traverses the pond. The barge includes a control cable and capstan winch to control movement of the barge. The barge also has a plurality of drain reels mounted on the barge, a plurality of feed rollers securing the horizontal drains, a plurality of drain guides guiding the horizontal drains from the feed rollers and inserting the drains into the settled sediment, a lift mechanism to move the drain guides vertically to release the horizontal drains at a desired depth, and an anchoring device to hold the beginning ends of horizontal drains in place while the barge moves backward to release said drains.

In another embodiment, the method of remediation includes the step of treating the consolidated, contaminated sediment in the pond by injecting a liquid reagent, clean water, or a cleaning solution into one level of horizontal drains and applying vacuum pressure to an adjacent level of horizontal drains to degrade, destroy, flush, or immobilize contaminants in the consolidated sediment.

In another embodiment of the invention, a method of remediating a submerged contamination site containing a total volume $V_T$ of contaminated sediment comprising water and fine-grained solids is provided. The method comprises the initial step of establishing a submerged disposal pond near the contamination site by: installing a water barrier structure around an area, removing any water from the area; removing any contaminated sediment from the area and temporarily storing it outside the pond; excavating non-contaminated earthen materials to a volumetric capacity sufficient to contain the consolidated total volume of contaminated sediment and storing the excavated clean material separately out of the area for later use; and, installing a liner system in the interior of the disposal pond.

After the disposal pond is established, contaminated sediment is dredged and transferred into the pond and consolidated using the same method as described above. The pond is then closed by covering the consolidated, contaminated sediment with a final cover that may include excavated clean material and an impermeable liner.

In another embodiment, a system for dewatering and consolidating a total volume $V_T$ of sediment having a mixture of water and fine-grained solids is provided. The system comprises a disposal pond near the contamination site for containing the sediment, a plurality of coplanar drains arranged in parallel, vertically-spaced levels relative to the bottom of the pond, a vacuum pump connected to each said drains, and a barge for traversing the pond and installing said drains in the sediment. The drains preferably comprise wick drains or tube drains having lateral spacing between each drain of about 1.2 to 1.8 m and initial vertical spacing between each level of about 1.8 to 3.0 m. In a preferred embodiment, the drains are connected to a collector hose using T-joints. The collector hoses are connected to a header pipe, which is connected to a vacuum pump.

A further embodiment of the invention provides a method of dewatering and consolidating a total volume $V_T$ of sediment in a submerged disposal pond. The method involves initially establishing a submerged disposal pond in or near the contamination site by installing a silt curtain enclosing a disposal area to minimize migration of suspended sediment out of the area; removing a sufficient volume of non-contaminated earthen materials from the area to create a volumetric capacity sufficient to contain the consolidated total volume of contaminated sediment and storing the excavated clean material separately out of the area for later use; and, installing a submerged liner on the bottom of the disposal pond to minimize migration of contaminants after completion of sediment disposal and pond closure.

After the pond is established, contaminated sediment is dredged and transferred into the pond and consolidated using the same method as described above. The pond is then closed by covering the consolidated, contaminated sediment with a layer of excavated clean material and an impermeable liner.

In this embodiment of the invention, the method may include the steps of establishing the submerged disposal pond in the area of contaminated sediment and removing any contaminated sediment from the pond and temporarily storing it outside the pond prior to removing the non-contaminated earthen materials. If the disposal pond is established outside the contamination area, it is not necessary to initially remove the contaminated sediment. In both cases, it is not necessary to remove any water from the pond area.

In this embodiment, the liner is installed under water. Preferably, the liner comprises a bentonite mat, which can be placed in water with overlaps and which easily submerges to the bottom of the pond.

As sediment is dredged and pumped to a disposal pond as a slurry, sediment settles at the bottom. As settled sediment accumulates, a plurality of flexible drains are placed horizontally into the settled sediment and parallel to each other using a drain installation barge floating on the water surface. These drains are installed 1.2 to 1.8 m apart at the same depth, preferably 1.2 to 1.5 m above the bottom. Horizontal drains preferable for this application are wick drains used the accelerated consolidation of clayey soils or perforated, flexible tube drains wrapped with geotextile filter. Using T-joints, these drains are connected to a collector hose which in turn is connected to a header pipe leading to a vacuum pump. Operation of the vacuum pump extracts water from the settled sediment layer surrounding the horizontal drains and consolidates the settled sediment layer. Volume reduction resulting from this consolidation creates more disposal capacity in the disposal pond otherwise unavailable and allows continued discharge of dredged sediment into the disposal pond.

As the settled sediment builds up further above the consolidating layer in the disposal pond, another plurality of horizontal drains are installed at a new depth, preferably 1.8 to 3.0 m higher than the first depth of horizontal drains. Repeating this process of discharging dredged sediment and installing horizontal drains along with vacuum pumping operation allows continued dredging and discharge of sediment to fill the disposal pond with consolidated sediment. This method offers three advantages over the conventional method of full disposal followed by consolidation using vertical wick drains (with or without vacuum): no waste of pond capacity taken up by a large volume of fill, faster completion of the project, and project completion for a lower cost.

Upon completion of dredging and disposal operation, the surface of the disposal pond is graded with fill to achieve positive drainage and a final cover is installed to close the disposal pond as a landfill. After installing the final cover, vacuum pumping continues for some time to over-consolidate the consolidated sediment. Over-consolidation is an effective means of minimizing post-closure leachate generation and settlement of the final cover.

The present invention may be used to treat contaminated sediment in the disposal pond by injecting liquid reagents via the horizontal drains for bioremediation, chemical oxidation, or stabilization. Contaminants in the sediment may be flushed out by injecting clean water or a cleaning solution through a set of horizontal drains and extracting the same through another set of horizontal drains. This treatment step may be implemented either before or after final cover installation.

One effective use of the present invention is disposal of dredged sediment below the original sediment surface line, "subsediment" disposal. Sediment remediation often faces various obstacles such as limited land area making on-site disposal not possible or regulatory constraints making in-situ capping unacceptable. The regulatory constraints include no net fill flood storage areas, no loss of water depth in navigable channels, and no loss of wetlands. While these obstacles often force costly off-site disposal, the present invention can overcome these obstacles by a drastic reduction of the sediment volume by consolidation and disposal below the original sediment surface line in near-shore water areas.

In another preferred embodiment, the invention provides a capping method for remediating in situ contaminated sediment without decreasing the initial water depth above the contaminated sediment. In this preferred embodiment, the method induces a sufficient amount of consolidation settlement from the contaminated sediment, and optionally the uncontaminated sediment underlying the contaminated sediment, to accommodate the cap material without causing any net loss of initial water depth $DW1$. In this embodiment, the contaminated sediment is contained in place by installing over the target sediment area an in-situ cap having a total thickness TCP. The total initial in-situ thickness $TCS1$ of contaminated sediment is consolidated or compressed to a reduced thickness $TCS2$ until the settlement ($TCS1-TCS2$) exceeds the cap thickness TCP.

In another embodiment, the method induces a sufficient amount of consolidation settlement from in-situ contaminated sediment, and optionally from uncontaminated sediment underlying the contaminated sediment, to accommodate the cap material without reducing the flow capacity. The method consolidates the sediment soon after placement of the cap material. As a result, the average depth of the final top surface of the in-situ cap 111 is equal to or larger than the average depth of the original in-situ top surface 104 of the sediment. These methods may be used to compress sediment having a high water content and consisting primarily of fine-grained solids such as silt-sized and clay-sized particles.

The sediment is consolidated by applying vacuum pressure to horizontal line drains installed within the sediment. In preferred embodiments, a plurality of horizontal line drains are installed in the sediment and connected to a vacuum source before installing the in-situ cap. After installing the in-situ cap, vacuum pressure is applied to all of the horizontal line drains to extract pore water from the sediment. Alternatively, vacuum pressure may be sequentially applied to and maintained on particular drains only until the sediment that surrounds those particular drains is consolidated.

To prevent drawing a large volume of water from the water column above the sediment, the in-situ cap should include a low-permeability linen. A vertical barrier should also be installed along the edge of the in-situ cap to minimize lateral water flow into the horizontal line drains through permeable sediment zones such as sandy seams.

Initially, a plurality of parallel, coplanar horizontal line drains are installed on a vertical or horizontal plane within the sediment layer. Installation of vertical planes of horizontal drains is repeated laterally or installation of horizontal planes of horizontal drains is repeated vertically within the sediment, until the entire volume of the target sediment is reached by the horizontal drains.

In another preferred embodiment, the sediment is also treated in-situ while capped. Sediment treatment may be achieved by injecting a liquid reagent, clean water, or a cleaning solution into a set of horizontal drain and extracting the same from the other horizontal drains to degrade, destroy, flush, or immobilize contaminants in the sediment.

In preferred embodiments, the sediment is minimally disturbed during drain installation by suspending the drain supply from the water surface and plowing the drains into the sediment layer. In another preferred embodiment, the extracted water is collected and treated using an appropriate treatment means before returning it to the water source.

When vacuum pumping stops after achieving the target settlement, the sediment is "over consolidated" condition having a tendency of rebound and effectively retain residual contaminants in the sediment. This over consolidation feature prevents future upward flux of contaminants to the water column, thereby enhancing the containment performance afforded by this invention.

BRIEF DESCRIPTION OF THE DRAWINGS

FIG. 1a is a profile of a typical disposal pond built for disposal and containment of dredged sediment;

FIG. 1b is a profile of a disposal pond with dredged sediment being discharged;

FIG. 1c is a profile of a disposal pond as horizontal drains are placed in the settled sediment and connected to a vacuum pump;

FIG. 1d is a profile of a disposal pond with a plurality of horizontal drains placed at different depths and connected to a vacuum pump;

FIG. 1e is across-section of a preferred arrangement of multi-level horizontal drains to achieve an equilateral triangular pattern in the later stage of consolidation;

FIG. 1f is a profile of a disposal pond when sediment disposal is completed and a final cover is installed;

FIGS. 5a-c show steps of subsediment disposal wherein contaminated sediment is consolidated and contained in a disposal cell below the original sediment surface line;

FIG. 8a is a schematic sectional view of an in-situ cap and horizontal line drains installed in the sediment layer of FIG. 7a before consolidation settlement in accordance with the method of a preferred embodiment of the invention;

FIG. 8b is a schematic sectional view of the contaminated sediment site of FIG. 7a after consolidation settlement showing no loss of water depth in accordance with the method of a preferred embodiment of the invention;

FIG. 11a is a schematic sectional view of a vertical barrier constructed with a narrow trench filled with bentonite aggregate;

FIG. 11b is a schematic top plan of the several steps of installing a vertical barrier using a trenching beam in accordance with an embodiment of the invention; and, FIG. 12 is a schematic illustration of the major components of an apparatus in accordance with an embodiment of the invention.

DETAILED DESCRIPTION OF PREFERRED EMBODIMENTS

Figure 1A:
FIG. 1a through 1f disclose typical steps of implementing the present invention from start to finish.

For the purpose of illustration only, an embodiment of the invention is shown in the accompanying drawings. However, it should be understood by those of ordinary skill in the art that the invention is not limited to the precise arrangements and instrumentalities shown therein and described below. Throughout the specification, like reference numerals are used to designate like elements. Numerous changes and modifications within the spirit and scope of the invention will become apparent to those skilled in the art from this detailed description.

As used throughout the specification, the following definitions shall apply: "water depth" means the distance from the water surface to the uppermost surface of the original sediment prior to remediation, or the distance from the water surface to the uppermost surface of materials placed as part of remediation, such as an in-situ cap, as the case may be; "total settlement" means the change in elevation of the uppermost sediment surface layer due to consolidation of contaminated sediment and uncontaminated sediment under the in-situ cap.

In a first embodiment of the invention, a method of consolidation dewatering for pond disposal of dredged sediment, concurrently as dredged sediment is discharged into the disposal pond, by horizontally installed drains and vacuum loading is provided. The method of the first embodiment is described below.

FIGS. 1a-f disclose a preferred embodiment of the present invention from start to finish. Referring to FIG. 1a, a disposal pond 11 is built to receive dredged sediment, often with a perimeter dike 12 and some excavation of the ground.

Figure 1B:
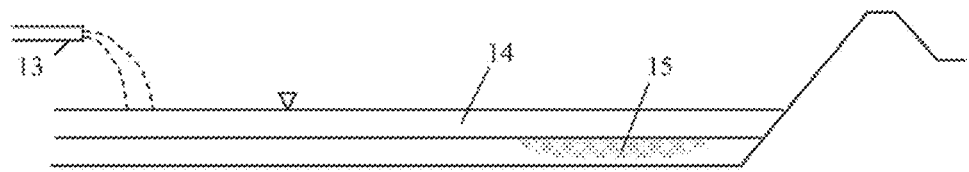

In FIG. 1b, dredged sediment 14 is discharged to disposal pond 11 via a discharge pipe 13. At this stage, the dredged sediment 14 is a slurry. As discharge of dredged sediment 14 continues, solids in dredged sediment 14 settle out at the bottom and the thickness of settled sediment 15 gradually increases.

Figure 1C:
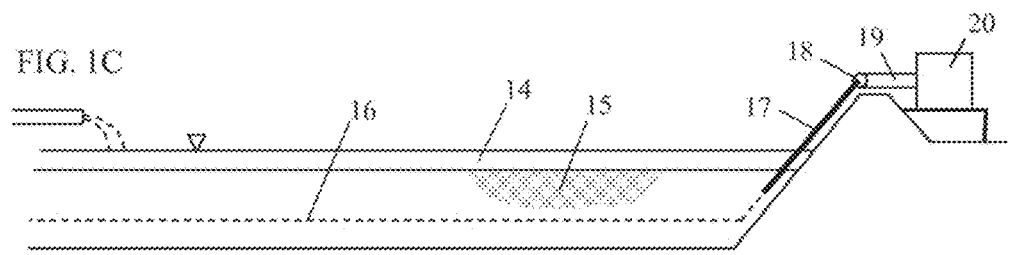
Figure 2:
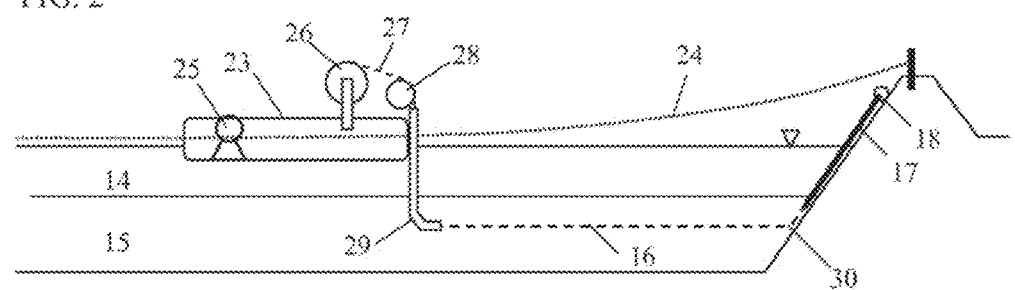
FIG. 2 is a schematic showing essential components of a floating craft used to install horizontal drains.

FIG. 1c shows the profile of disposal pond 11 when the first set of horizontal drains 16 is installed. When the thickness of settled sediment 15 is sufficient, i.e., at least 2 to 2.4 m, a plurality of horizontal drains 16 are installed at about 1.2 to 1.5 m above the bottom of disposal pond 11. Horizontal drains 16 are installed from a floating craft as depicted in FIG. 2. Preferably, horizontal drains 16 must be at least 0.5 m below the surface of settled sediment 15 to keep horizontal drains 16 from floating. Preferable horizontal drains are wick drains used for consolidation of soft clay soils or perforated, flexible tube drains wrapped with geotextile. Horizontal drains 16 are installed parallel to each other, at a distance of 1.2 to 1.8 m, depending on the hydraulic conductivity of settled sediment 15. Horizontal drains 16 are connected to a vacuum pump 20 via a T-joint 17, a collector hose 18, and a header pipe 19. Details of this embodiment are further depicted in FIG. 3.

The operation of vacuum pump 20 exerts suction along header pipe 19, collector hoses 18, and horizontal drains 16. This suction extracts water from the settled sediment 15 surrounding horizontal drains 16, leading to consolidation of settled sediment 15. As a result, the thickness of settled sediment 15 decreases and more capacity is created in disposal pond 11, allowing continued discharge of dredged sediment 14 into disposal pond 11.

Figure 1D:
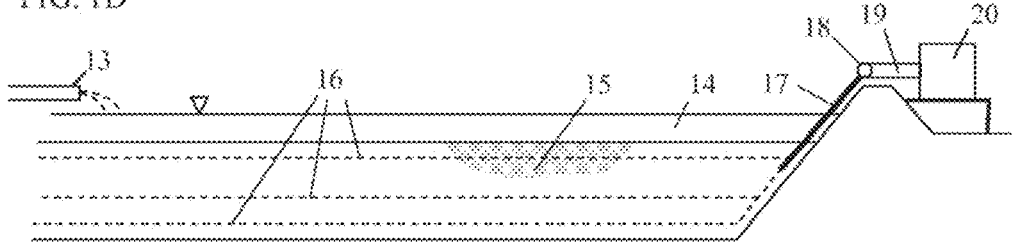
Figure 1E:
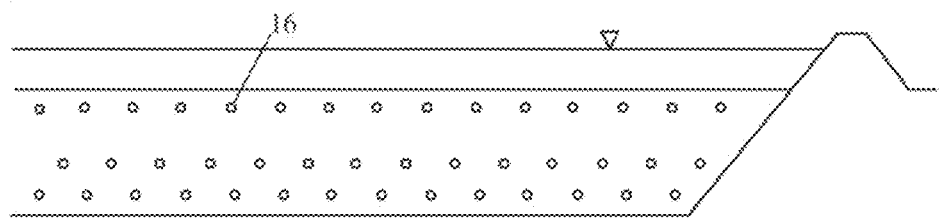

As continued discharge of dredged sediment 14 further increases the thickness of settled sediment 15, another set of horizontal drains 16 is installed, preferably about 1.8 to 3 m above the first set of horizontal drains, depending on the density of settled sediment 15 and expected final density after consolidation, as shown in FIG. 1*d*. FIG. 1*e* is a cross-section view of FIG. 1*d*, showing a preferred embodiment of horizontal drains 16 as an equilateral triangle. Because the vertical separation distance of horizontal drains 16 in FIG. 1*e* decreases over time due to on-going consolidation, the equilateral triangle can be formed only during a limited period of time. The preferred timing of forming the equilateral triangle is toward the later stage of consolidation wherein the rates of consolidation slow down.

Figure 1F:
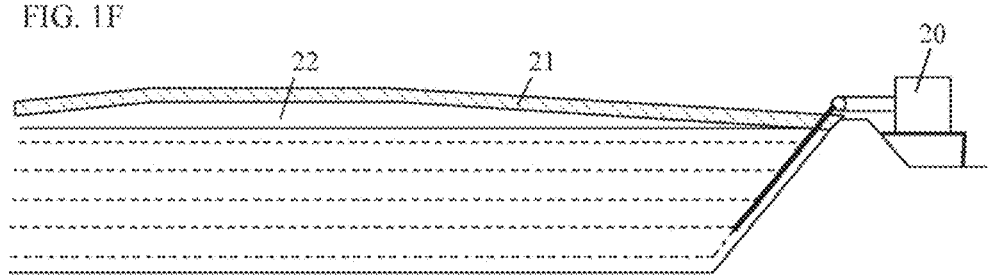

Continuing discharge of dredged sediment 14 and concurrent consolidation as described above will eventually fill disposal pond 11 with "consolidated sediment." Then, disposal pond 11 is closed as a landfill by installing a final cover 21 over the entire area as depicted in FIG. 1*f*. Prior to cover installation, the central area of disposal pond 11 may be raised with fill 22 to promote surface drainage.

FIG. 2 discloses a drain installation craft. The installation craft consists of a barge 23, a control cable 24, a capstan winch 25, a plurality of drain reels 26, a plurality of feed roller 28, and a plurality of drain guides 29. Drain 27 is unreeled from drain reel 26 and fed into drain guide 29 via feed roller 28. The installation craft moves typically straight backward using control cable 24 and capstan winch 25. First, drain 27 is inserted to the top of drain guide 29 and pulled out of the bottom end of drain guide 29. The guide and feed roller assembly is made to move vertically up and down to enable pulling of drain 27 from the bottom end of drain guide 29. Next, the end of drain 27 is joined to collector hose 18 using T-joint 17, as will be further described with FIG. 3. After connecting drain 27 with collector hose 18, drain 27 is anchored temporarily at a temporary anchoring point 30 using an anchoring device, preferably a trough-shaped weight, to keep drain 27 in place, and the installation craft moves backward using control cable 24 and capstan winch 25. As the craft moves, drain 27 is unreeled from the drain reel 26 and released from the bottom end of drain guide 29 into settled sediment 15, Settled sediment 15 is very soft at this stage and the depth of installation is only about 0.5 m from the surface of settled sediment 15. Therefore, the power requirement for the installation craft is not high. The installation craft is equipped with multiple drain reel-feed roller-drain guide sets to install multiple horizontal drains in one pass.

Figure 3:
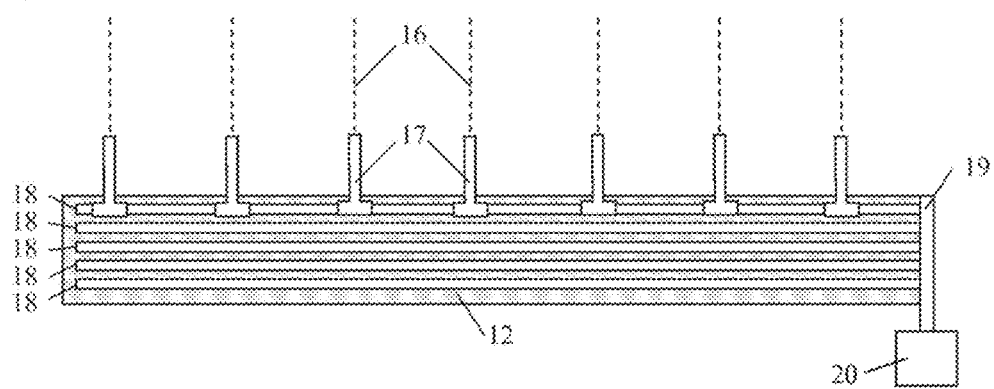
FIG. 3 is a plan view of a set of horizontal drains placed at a same depth and connected to a vacuum pump via T-joints, collector hoses and a header pipe.

Reaming to FIG. 3, T-joint 17 connects horizontal drain 16 and collector hose 18. The one joint with collector hose 18 is above dredged sediment 15 as shown in FIG. 2 and therefore, must be connected air tight to maintain vacuum in collector hose 18. However, the joint with horizontal drain 16 does not require air-tight connection as this joint is embedded in settled sediment 15 that provides seating against leakage of air at this joint. As a result, the present invention essentially uses the self-sealing property of settled sediment 15 to maintain vacuum pressure in horizontal drains 16. The use of this self-sealing property offers an economical and simple way of vacuum consolidation without sealing the entire surface area with a cumbersome and expensive liner. FIG. 3 shows multiple collector hoses 18, each connected to a plurality of horizontal drains 16, preferably from a particular depth. These collector hoses 18 need to be deployed neatly along perimeter dike 12.

A second embodiment of the present invention is to enhance containment performance by over-consolidation. Over-consolidation is a term referring to consolidation of soft clays under a load substantially exceeding the final load expected at the site. In this embodiment, vacuum pump 20 is operated for some time after final cover installation. Then, the entire sediment in disposal pond 11 is consolidated under the combined load of final cover 21, fill 22, and vacuum pressure. As this combined load forces the entire sediment to consolidate under a load larger than the final load consisting of final cover 21 and fill 22, the sediment is "over-consolidated." The advantage of over-consolidation is obvious; the over-consolidated sediment in disposal pond 11 will no longer release water (in this case, leachate) or settle further, after vacuum loading is removed.

Figure 4:
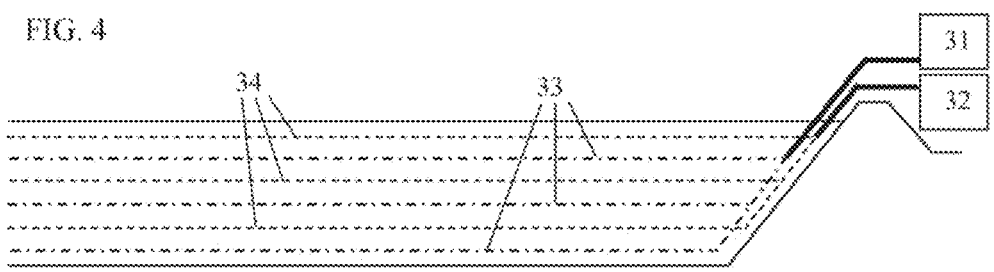
FIG. 4 is a profile of a disposal pond wherein alternating sets of horizontal drains are used for injection and extraction of treatment reagent.
Figure 6A:
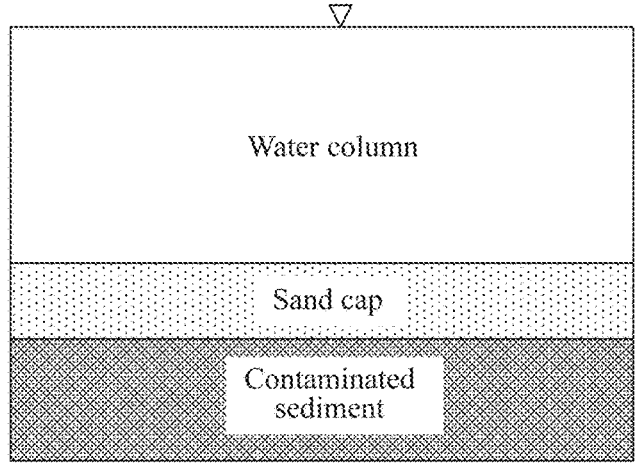
FIGS. 6a, 6b, and 6c schematic sectional view of prior art in-situ caps on contaminated sediment areas.
Figure 6B:
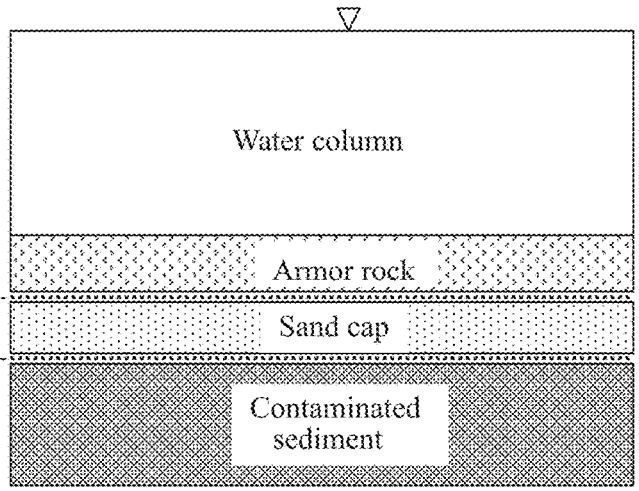
Figure 6C:
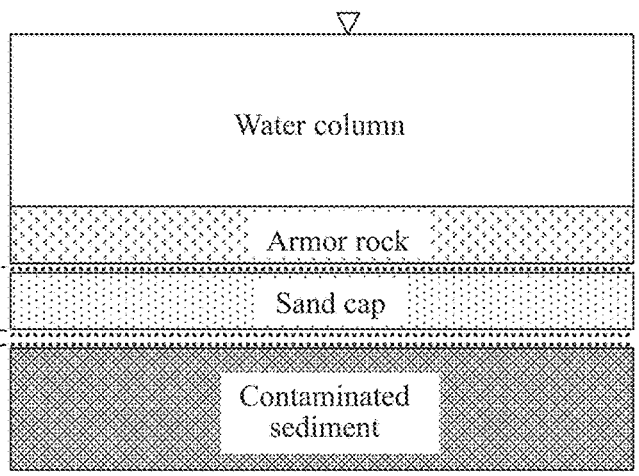
Figure 7A:
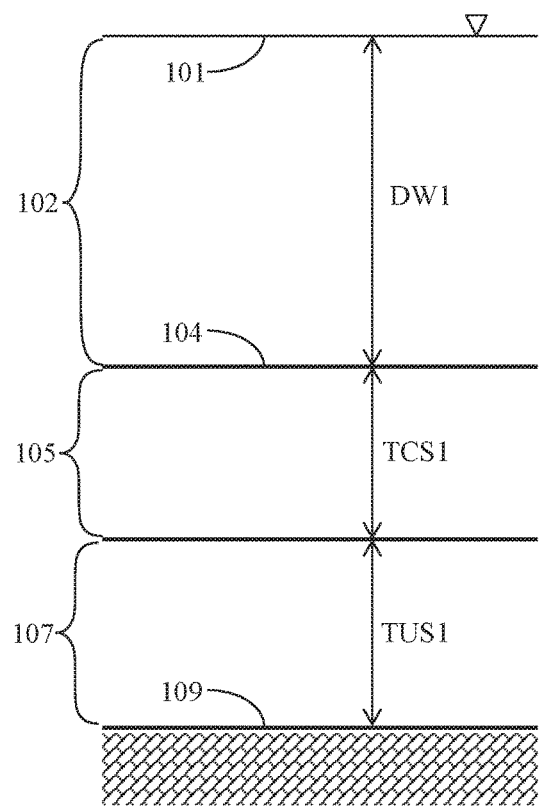
FIG. 7a is a schematic sectional view of a prior art contaminated sediment site showing the water and sediment column.
Figure 7B:
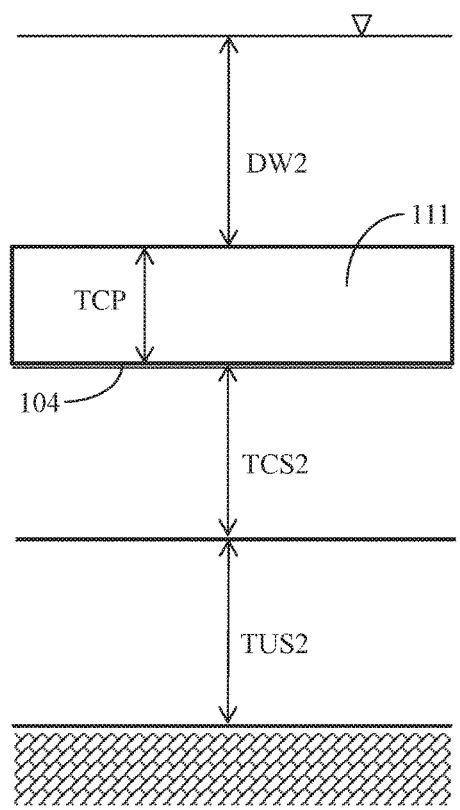
FIG. 7b is a schematic sectional view of the contaminated sediment site of FIG. 7a after installation of an in-situ cap in accordance with the prior art.

A third embodiment of the present invention is in-situ treatment of sediment using the horizontal drains already in the sediment as a pathway to deliver liquid reagents. In general, the hardest problem with in-situ treatment of sediment is delivery of reagents uniformly into the target sediment volume due to the heterogeneity of in-situ sediment. With horizontal drains densely embedded in the sediment that has been substantially homogenized during dredging and pumping, it is now very simple to deliver treatment reagents in a liquid form using an injection pump. Various biological, chemical or physical reagents may be used for this purpose. FIG. 4 discloses this embodiment wherein an injection pump 31 injects reagents through a set of horizontal drains 33 and an extraction pump 32 extracts reagents through another set of horizontal drains 34. Injecting clean water or a cleaning solution and extracting the same in this embodiment can flush the contaminants from the sediment for subsequent ex-situ treatment of liquid.

A fourth embodiment of the present invention is "subsediment disposal," i.e., dredged sediment is consolidated and contained in a space created below the original sediment surface line. This embodiment is designed to overcome various site and regulatory constraints such as limited land area for on-site disposal; no net fill or no loss of navigation depth in in-situ capping; and no wetland encroachment in on-site disposal. By emplacing the target sediment volume into a less than 10% of the original area and below the original sediment surface line, the subsediment disposal method can overcome insurmountable obstacles often encountered in sediment remediation. The method and steps of subsediment disposal are depicted in FIG. 5*a*, FIG. 5*b* and FIG. 5*c*.

FIG. 5*a* shows a typical cross-section of a contaminated sediment site where contaminated sediment 41 is bounded by the sediment surface line 42 below the water surface 43. It is important to note that contaminated sediment 41 is in general thin and covers a large area, which mikes subsediment disposal technically feasible.

FIG. 5*b* depicts a typical cross-section of a subsediment disposal cell during the construction stage. First, a structure 44 is installed to enclose the disposal cell area. This structure 44 may be a silt curtain intended to minimize the dispersion of suspended sediment during construction, or a water barrier (e.g., a sheetpile wall, an earthen berm, or an inflatable membrane dam) intended to exclude the surface water. The next step is to remove the contaminated sediment 45 from the area enclosed by the structure 44 by dredging or by excavation, for temporary storage within an area isolated by a second structure like 44 within the area of the contaminated sediment 41. Then, the disposal cell 46 is excavated to the excavation line 47, again by dredging or with excavation equipment. After excavation of the disposal cell 46, the bottom liner 48 is installed (if the cell design calls for to minimize contaminant migration from the disposal cell 46 after closure. The bottom liner 48, using a bentonite mat type liner, can be installed underwater without removing the water from the disposal cell 46. After the completion of the disposal cell 46, contaminated sediment 41 is dredged, placed in the disposal cell 46, and consolidated using this invention. The construction steps of FIG. 5B will be much simpler, if disposal cell 46 is built outside the contaminated sediment area 41, because a second structure 44 and double handling of the contaminated sediment 45 are not required.

FIG. 5c depicts across-section of the disposal cell 46 after subsediment disposal and closure of the cell. Now, the entire sediment volume 41 in FIG. 5A is contained in the disposal cell 46 in FIG. 5c. The clean soil excavated from disposal cell 46 is used for disposal cell cover 49 and for a buffer layer 50 where some residual contamination may be present. Two important facts should be noted from FIG. 5c: the volume of the disposal cell 46 is typically between 30 and 45% of the original volume 41 and the area of the disposal cell 46 is typically from 5 to 10% of the original area 41. This drastic reduction in the sediment volume and area are illustrated below using the realistic: sediment data found at contaminated sediment sites. Also shown are the typical ranges of the volume and area reduction possible by subsediment disposal.

Example—Reduction of Sediment Volume and Area by Subsediment Disposal

Typical in-situ solids content of fine-grained sediments (silts and clays) 35% by weight Typical specific gravity of fine-grained sediments (with some organics) 2.5

Take 1.0 kg of in-situ sediment (0.35 kg of solids and 0.65 kg of water)

Volume of solids 0.35/2.5=0.14 liter (L), water=0.65 L, and total=0.79 L

After consolidation using this invention, the typical volume ratio will be 50% solids and 50% water. Thus, the final volume of this sediment will be 0.14 L solids and 0.14 L water, totaling 0.28 L only 35% of the original in-situ volume of 0.79 L.

The average thickness of the in-situ sediment is typically 2 to 4 feet. For a disposal cell excavation depth 5 times the in-situ average thickness, the area required for the disposal cell may be calculated as follows:

From $V_D = 0.35 \times V_O \rightarrow A_D \times (5 \times T_O) = 0.35 \times (A_O \times T_O)$ $A_D = 0.07 A_O$ (area of disposal cell is 7% of the in-situ sediment area)

Where $V_D$=disposal cell volume $V_O$=in-situ sediment volume $A_D$=disposal cell area $A_O$=in-situ sediment area $T_O$=average thickness of in-situ sediment Thus, an in-situ sediment volume of, for example, 50,000 m³ (50,000 m²×1 m) may be contained in a disposal cell with a capacity of 17,500 m³ (35% of the in-situ sediment volume) and built in an area of 3,500 m² (7% of the in-situ sediment area).

Depending on the in-situ sediment properties and consolidation load that may include a thick cap, the final volume of the disposal cell may range from 30 to 45% of the in-situ volume. Depending on the average thickness of the in-situ sediment and the cell excavation depth, the disposal cell area may be between 5 and 10% of the in-situ sediment area.

The above example signifies the remarkable effects of subsediment disposal. The total volume of the original sediment 41 (e.g., 50,000 m³) in FIG. 5a is now in the disposal cell 46 (17,500 m³ capacity) in FIG. 5c. The excavated material (17,500 m³) from the disposal cell 46 is now spread over the area of the original sediment 41, taking a space below the original sediment surface line 42. As a result, the flood storage capacity and the navigation depth in the water body 51 in FIG. 5c have increased, to solve the issues of net fill and navigation depth. Therefore, subsediment disposal makes on-site sediment disposal feasible even if no land area is available. As the disposal cell 46 is fully below the original sediment surface line 42, this embodiment may be used for sediment disposal in wetland areas as well, by building a disposal cell in the subsurface of the wetland and restoring the wetland after sediment disposal. It is important to note that subsediment disposal offers several advantages over in-situ capping often used for sediment remediation projects: the final cap area is 5 to 10% of the in-situ cap area, cap and buffer materials are available from cell excavation, containment performance is enhanced by over-consolidation and deeper emplacement, and maintenance need is far less for the above reasons.

Yet another embodiment of the invention is illustrated in FIGS. 6-12. The consolidation methods illustrated with respect to FIGS. 6-12 have particular use in connection with consolidation dewatering in-situ of contaminated sediment without loss of water depth or flow capacity above the contaminated sediment.

Figure 10A:
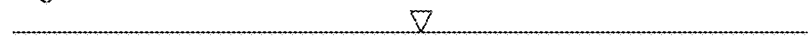
FIG. 10a is a schematic sectional view of an in-situ cap installed over the horizontal line drains and a vertical barrier along the edge of the in-situ cap.

Initially, a vertical barrier 135 is installed as shown in FIG. 10a, and a plurality of horizontal line drains 121 and 122 are installed into the contaminated sediment layer 105 and the uncontaminated sediment layer 107 as shown in FIG. 8a. The horizontal drains 122 are used only when necessary to achieve a desired total settlement. The ends of all horizontal line drains 121 and 122 will be connected to a vacuum pump via flexible suction hoses, a header pipe, and a suction manifold as described later in FIG. 12.

After the horizontal drains are installed, the in-situ cap 111 is installed as shown in FIG. 8a. The in-situ cap 111 normally includes an impermeable liner 134 as shown in FIG. 10a. Then, vacuum pressure is applied to the horizontal line drains 121 and 122 to extract pore water from the sediment layers 105 and 107, which causes consolidation of sediment layers 105 and 107, Since contaminated sediment comprises recent deposits in water that has not been subject to any major load, it is relatively loose and highly compressible. Therefore, a site-specific design can achieve total settlement exceeding the cap thickness TCP, as illustrated in FIG. 8b.

In preferred embodiments, the horizontal line drains 121 and 122 comprise wick drains or tube drains. The drains 121, 122 are flexible line drains easy to install by planting into the sediment layer using simple equipment. A wick drain is a long strip of geocomposite material consisting of a plastic core wrapped with geotextile filter and its dimension is typically about 0.5 cm thick and 10 cm wide. A preferred tube drain for practicing the method of this invention is a slotted, corrugated plastic pipe with a 4 to 5 cm diameter and wrapped with geotextile filter. These drains are provided in rolls lengths of 100 m or longer with appropriate connections for flexible suction hoses leading to the vacuum pump. The horizontal line drains 121 and 122 may be installed using the equipment and in the arrangement and spacing described above, Preferably, the drains are installed parallel to each other at a distance of 1.2 to 2.0 m laterally and 0.9 to 1.5 m vertically. The closer vertical distance is desirable because the vertical permeability of sediment deposits is in general lower than the horizontal permeability.

Vacuum pressure is applied to the horizontal line drains until the desired total settlement is achieved, FIG. 8.b illustrates the position of the cap 111 and sediment layers after the targeted level of total settlement is achieved. The entire cap 111 is now below the original surface 104 of the contaminated sediment, thereby preventing any loss of water depth DW1. After consolidation settlement, the thicknesses of the sediment layers TCS2, TUS2 are much smaller than the original thicknesses TCS1, TUS1, respectively, and the vertical distances between the horizontal line drains are closer than the initial distances.

Figure 9:
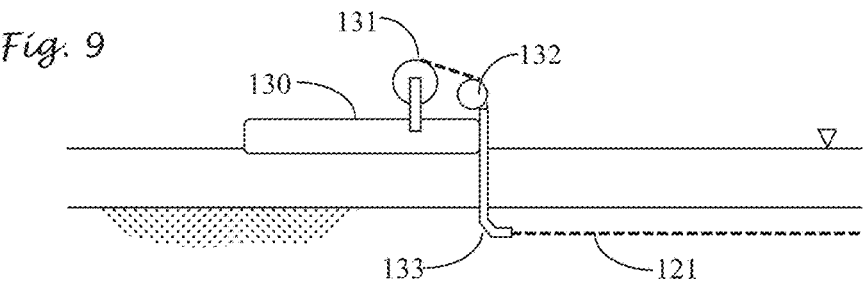
FIG. 9 is a schematic illustration showing essential components of a floating craft used to install horizontal drains in accordance with the method of an embodiment of the invention.

FIG. 9 discloses a method of installing the horizontal line drain from a barge 30 in accordance with an embodiment of the invention. The drains 121 or 122 are unrolled from a drain roll 131 through a feed roller 132, and released into the sediment 105 and 107 through hollow stem guides 133, while hollow stem guides 133 makes a cut through (plows) the sediment as the barge 130 traverses the water. Depending on the sediment thickness and configuration of horizontal line drains, the barge 130 and drain installation implements may be configured to multiple horizontal line drains in one pass.

The "cut-and-release" method of horizontal line drain installation inevitably leaves vertical "cuts" in the sediment layer above the horizontal line drains. As a result, vacuum pumping from the horizontal line drains may draw water from the water column above through these cuts, making pore water extraction from the sediment layers ineffective. Therefore, after installing the horizontal line drains, the surface of contaminated sediment 104 should be seated with a low permeability liner 134, a component of the in-situ cap as shown in FIG. 10a. In addition, a vertical barrier 135 should be installed along the edge of the surface liner area to minimize the lateral inflow of water through sand seams common in sediment deposits. Low permeability materials effective for the surface liner and vertical barrier include geomembranes heavier, than water, bentonite mat, or bentonite aggregate. Bentonite aggregate comprises bentonite products in an aggregate form designed to allow easy settling through the water column. Examples of bentonite aggregate include bentonite pellets or Aquablock®.

For overall integrity and easier installation, the vertical barrier 135 should preferably be installed before installing the surface liner 134. The vertical barrier 135 may be installed by planting bentonite mat panels or filling a thin trench with bentonite aggregate.

Figure 10B:
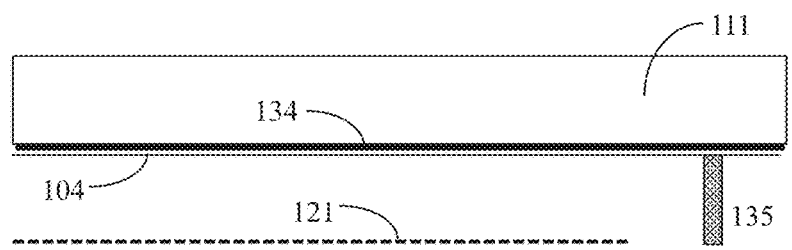
FIG. 10b is a schematic sectional view of a planting frame consisting of mounting plate and a cover plate.

The bentonite mat planting method, disclosed in FIG. 10b section view, uses a planting frame consisting of a mounting plate 136 and a cover plate 137. A bentonite mat panel 138 is mounted on the mounting plate 136, the mounting plate 136 is covered with the cover plate 137, and the planting frame assembly is lowered to the desired depth. Each bentonite mat panel 138 must be installed with a bottom anchor to secure the bentonite mat panel 138 in place and must overlap with the next bentonite mat panel. Section view of FIG. 10b shows an embodiment of the bottom anchor, wherein a wooden anchor block 139, with the bentonite mat panel 138 stapled onto it, is inserted into an anchor block housing 140. After the entire assembly is lowered to the desired depth, the cover plate 137 is removed first, the anchor block 140 is pulled upward to expose the anchor block 139, and then the mounting plate 136 is removed.

Figure 10C:
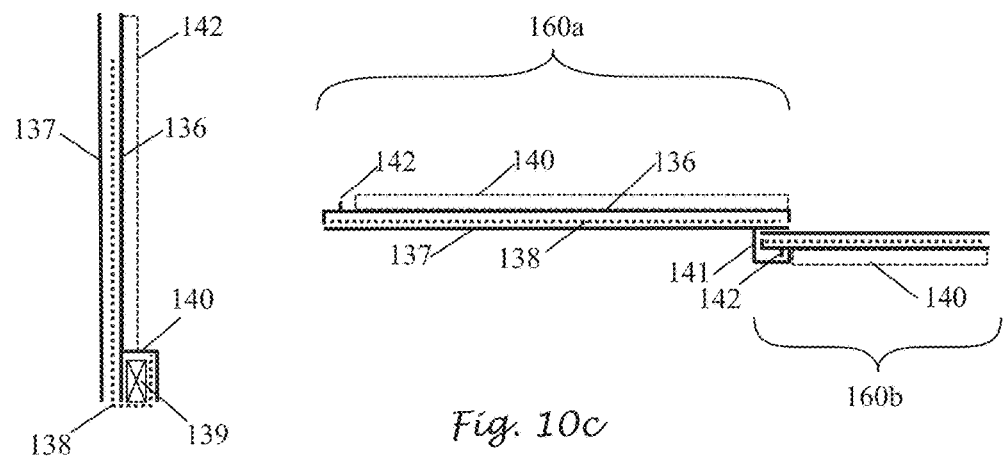
FIG. 10c is a schematic top plan view of the vertical barrier formed using multiple planting frames.

FIG. 10c shows an embodiment of overlapping bentonite mat panels with a joint housing 141 and a joint hook 142. Two planting frames 160a, 160b are required to construct the overlaps. It should be noted that the second frame 160b is a mirror image of the first assembly 160a. After the first frame assembly 160a is lowered to the desired depth, the second frame assembly 160b is lowered with the joint hook 142 of the second frame 160b sliding through the joint housing 141 of the first frame 160a. Then, the cover plate 137, including joint housing 141, is removed, the anchor block housing 140 is lifted to expose the anchor block 139, and then the mounting plate 136 is removed. Subsequently, the first frame assembly 160a is prepared and the above steps are repeated. The space left between overlapping bentonite mat panels 138 after removing 137 in the joint housing closes by lateral pressure exerted by the sediment and cap materials, in addition to swelling of bentonite mat. To avoid interference between anchor block housing 140, joint housing 141 and joint hook 142, anchor block housing 140 is attached to the bottom of mounting plate 136, joint hook 142 terminates above anchor block housing 140, and anchor block housing 140 terminates about 3 inches apart from joint hook 142.

FIG. 11a shows a trench fill method of vertical barrier 135 wherein trench 143 is fitted with bentonite aggregate 144. FIG. 11b shows the steps of installing vertical barrier 135 using a trenching beam 145 consisting of two moveable plates 146 and two end flanges 147 (Step 1). The trench fill method involves the steps of inserting trenching beam 145 to a desired depth, opening plates 146 to provide a cavity 148 (Step 2), filling the cavity 148 with bentonite aggregate 144 (Step 3), lifting trenching beam 145 leaving the bentonite aggregate in place (Step 4), and inserting trenching beam 145 into the next position with an overlap as shown in Step 5. After installing the vertical barrier, referring to FIG. 10b, the in-situ cap 111 and impermeable liner 134 are laid over the vertical barrier 135 to extend at least 1 m beyond the vertical barrier.

FIG. 12 schematically illustrates major components and operational aspects of the invention. The overall implementation steps include installing vertical barrier 135, installing horizontal line drains 121 and 122 into sediment layers 105 and 107, connecting horizontal line drains 121 and 122 to flexible suction hoses 149, installing an in-situ cap 111 including impermeable liner 134, connecting flexible suction hoses 149 to header pipe 150 that leads to suction manifold 151 and vacuum pump 152, operating vacuum pump 152 to extract pore water from the sediment, and treating extracted pore water using treatment means 153.

To highlight the fundamental basis of the invention, illustrated below are estimates of the effective stress and consolidation settlement feasible from vacuum-based consolidation.

Effective Stress from Vacuum Pumping—Contaminated in-situ sediment cannot be consolidated with traditional surcharge fill for many reasons: low effective stress due to the buoyancy of the fill material placed under water; impracticability of removing the fill material after completion of consolidation; mixing of the fill material with contaminated sediment; and migration of contaminated pore water squeezed out from the sediment to the fill material. In case of effective stress, for example, placing typical 4 m of sand with a unit weight of 1,600 kg/m$^3$ can exert only 2,400 kg/m$^2$ of effective stress. However, the vacuum loading can exert 7,200 kg/m$^2$ of effective stress, based on the atmospheric pressure of 10,330 kg/m$^2$ at sea level and field effectiveness of vacuum at about 70%. In addition, vacuum pumping can eliminate all other problems associated with underwater surcharge fill.

Consolidation Settlement Estimate—Vacuum pumping extracts pore water from in-situ sediment and induces consolidation settlement. Contaminated sediments typically have a solids content of about 35% by weight. This solids fraction by weight is equivalent to 18% solids and 82% water by volume, based on the typical specific gravity of 2.5 for solids. After consolidation settlement, the same sediment will retain the same solids volume of 18%, contain a water volume similar to solids volume of 18%, and have lost a water volume of 64% by dewatering. As a result, the final sediment thickness will be about 36% of the original thickness. This thickness change is the basis of the invention enabling in-situ capping with no loss of water depth.

This invention highlights a method of preventing net loss of water depth caused by in-situ capping. Because of unknown site conditions that may include variation of sediment composition or foreign materials buried in the sediment, the total settlement at some limited points in the cap area may cause a small toss of water depth. However, it is to be understood that the average total settlement will not cause any net toss of water depth and therefore, the overall performance of this invention in terms of flow capacity, flood storage or navigation depth will not be compromised.

It is to be understood that the description, specific examples and data, while indicating exemplary embodiments, are given by way of illustration and are not intended to limit the present invention. Various changes and modifications within the present invention will become apparent to the skilled artisan from the discussion, disclosure and data contained herein, and thus are considered part of the invention.

The invention claimed is:

1. A method of remediating contaminated sediment overlying an uncontaminated subsurface, the sediment having an initial water depth and comprising water and fine-grained solids and an initial water depth DW1, comprising the steps of:
   a) containing the contaminated sediment in place by installing over the contaminated sediment an in-situ cap having a total thickness TCP; and,
   b) consolidating by dewatering at least one of the contaminated sediment and the uncontaminated sediment until the total settlement of the contaminated and uncontaminated sediment exceeds the thickness TCP of the in-situ cap, said consolidating step comprising:
      i) installing a plurality of horizontal line drains into the sediment and connecting all of said horizontal line drains to a vacuum source before installing the in-situ cap; and,
      ii) applying vacuum pressure to all horizontal line drains to extract water from the sediment after installing the in-situ cap.

2. The method of remediating recited in claim 1, wherein the sediment is consolidated until the water depth of the in-situ cap exceeds the initial water depth of the sediment.

3. The method of remediating recited in claim 1, including the step of installing a vertical barrier along the edge of the in-situ cap to minimize lateral water flow into the horizontal line drains.

4. The method of remediating recited in claim 1 including the step of installing a plurality of parallel, coplanar horizontal line drains on horizontal or vertical planes, within the sediment.

5. The method of remediating recited in claim 1, including the step of treating in-situ the contaminated sediment by injecting a solution selected from the group consisting of liquid reagent, clean water, or a cleaning solution into select horizontal drains and extracting the solution from at least one other horizontal drain.

6. The method of remediating recited in claim 1, including the step of minimizing disturbance of the sediment during drain installation by suspending a drain supply from a barge and plowing the drains into the sediment layer.

7. The method recited in claim 1, wherein vacuum pressure is sequentially applied to and maintained on particular drains only until the sediment that surrounds those particular drains is consolidated.

8. A method of installing an in-situ cap over a contaminated sediment area with no loss of water depth above the cap, said contaminated sediment area having an initial thickness TCS1 of contaminated sediment and TUS1 of uncontaminated sediment, said sediment having an initial water depth DW1, comprising the steps of:
   a) installing a vertical barrier along the perimeter of the contaminated sediment area;
   b) installing a plurality of horizontal line drains into at least one of the contaminated and uncontaminated sediment layers, and connecting the horizontal line drains to a vacuum source;
   c) installing an in-situ cap over the contaminated sediment area and over the upper edge of the vertical barrier, said cap having an initial water depth DW2 less than DW1 after cap installation;
   d) applying vacuum pressure to the horizontal line drains to dewater and consolidate the sediment; and,
   e) maintaining the vacuum pressure on the horizontal line drains until the water depth DW2 of the cap exceeds DW1.

9. The method of installing an in-situ cap recited in claim 8, wherein the horizontal line drains are installed by plowing hollow stem guides through the sediment layer and releasing the drains from the end of the guides.

10. The method of installing an in-situ cap recited in claim 9, including the step of supporting the hollow stem guides from a barge above the sediment.

11. The method of installing an in-situ cap recited in claim 8, wherein the vertical barrier is installed from a barge above the contaminated sediment.

12. The method of installing an in-situ cap recited in claim 8, including the step of treating the extracted pore water and discharging the treated pore water back into the aqueous body proximate the contaminated sediment area.

13. The method of installing an in-situ cap recited in claim 8, including the step of treating in-situ the contaminated sediment by:
   a) injecting a treating agent, selected from the group consisting essentially of a liquid reagent, clean water, or a cleaning solution, into select horizontal drains; and,
   b) extracting the treating agent from at least one other horizontal drain to force reagent flow through the sediment to degrade, destroy, flush, or immobilize contaminants in the sediment.

14. The method of installing an in-situ cap recited in claim 1, including the step of minimizing water migration through the cap and vertical barrier by installing a low permeability barrier within the cap and a vertical barrier along the perimeter of the cap area, respectively.

15. The method of installing an in-situ cap recited in claim 14, said step of minimizing water migration through the vertical barrier comprising planting bentonite mat panels into the sediment using a planting frame or by filling a narrow trench with bentonite aggregate using a trenching beam.

16. The method of installing an in-situ cap recited in claim 14, said step of minimizing water migration through the cap comprising installing a low permeability liner of bentonite mat, heavier-than-water geomembrane, or bentonite aggregate.

17. A method of remediating a contaminated sediment area with no loss of flow capacity above the area, the sediment comprising water and fine-grained solids and having an initial average water depth, comprising the steps of:
   a) installing a plurality of horizontal line drains into the sediment, and connecting the horizontal line drains to a vacuum source;
   b) installing an in-situ cap over the contaminated sediment area, said cap having an initial average water depth;
   c) applying vacuum pressure to the horizontal line drains to dewater and consolidate the sediment; and,
   d) maintaining vacuum pressure on the horizontal line drains until the average water depth of the cap exceeds the initial average water depth of the sediment.

* * * * *